United States Patent [19]

Jordan

[11] 4,181,481

[45] Jan. 1, 1980

[54] ROTARY INTERNAL COMBUSTION ENGINE

[76] Inventor: Alfred Jordan, Drususstrasse 25, 5300 Bonn, Fed. Rep. of Germany

[21] Appl. No.: 858,529

[22] Filed: Dec. 7, 1977

[30] Foreign Application Priority Data

Dec. 15, 1976 [DE] Fed. Rep. of Germany ....... 2656751

[51] Int. Cl.² .................... F01C 1/00; F01C 19/00; F01C 21/00
[52] U.S. Cl. ..................................... 418/253; 418/270
[58] Field of Search ....................... 418/253, 254, 270; 123/241

[56] References Cited

U.S. PATENT DOCUMENTS

| 716,970 | 12/1902 | Werner | 418/270 |
|---|---|---|---|
| 3,369,529 | 2/1968 | Jordan | 418/270 |

FOREIGN PATENT DOCUMENTS 2321763 11/1974 Fed. Rep. of Germany ........... 418/270

*Primary Examiner*—John J. Vrablik
*Attorney, Agent, or Firm*—Michael H. Striker

[57] ABSTRACT

A rotary internal combustion engine includes a housing having a chamber defined by an inner surface of oval outline in which a plurality of pistons are arranged, each having a wall portion facing the internal surface. The pistons are linked to each other at adjacent ends by combined sealing and linkage means, which are in sealing contact with the respective piston ends and with the internal surface of the housing. A shaft journalled in the housing extends coaxially through the chamber, and motion transmitting means are provided between the shaft and the combined sealing and linkage means rigidly connected at inner portions thereof to the shaft and carrying the combined sealing and linkage means movable towards and away from the shaft axis. The engine includes further means for transmitting radial forces acting on the pistons to the shaft and comprising arm means turnably mounted on the shaft and pivotally connected to the pistons intermediate opposite ends of the latter.

8 Claims, 10 Drawing Figures

ROTARY INTERNAL COMBUSTION ENGINE

BACKGROUND OF THE INVENTION

The present invention relates to a rotary internal combustion engine operable by a mixture of fuel and air or by diesel oil injection. The engine includes a housing having an inner surface of oval outline in which four identical segment-like pistons rotate, which are connected at adjacent ends pivotally to each other by link rolls and sealing carrier rolls, in which the seals carried by the latter are in engagement with the inner oval surface of the housing and in which the transmission of the forces from the piston onto a shaft turnably mounted in the housing is carried out by a pair of arm means fixedly secured to the shaft and provided with radial length variable arms and a second pair of arms mounted on the shaft turnable with respect thereto.

According to the German Pat. No. 1,295,569 a rotary internal combustion engine is known, in which two pistons are provided, which are connected to the shaft by means of two diametrically opposite arms fixedly connected to the shaft.

According to the German Pat. No. 1,451,764 another rotary internal combustion engine is known, in which four pistons in form of an equilateral link quadrangle rotate, whereby as a drive connection between the pistons and the shaft four arms are provided, which include a pair of arms which are rigidly connected to the shaft and a second pair of arms which is arranged turnable about the shaft. This arrangement has the disadvantage that no uniform turning of the shaft can be obtained.

Rotary internal combustion engines are further disclosed in my own U.S. Pat. Nos. 3,295,505 and 3,369,529. The first of the two-mentioned U.S. patents includes only two pistons which are connected to the shaft by radial arms and the second of my two patents includes four pistons linked together to an equilateral quadrangle and in which the transmission of rotation of the pistons to the shaft is carried out by four radially extending length variable arms, each fixedly connected at one end to the shaft. This arrangement has the disadvantage that the forces acting on the pistons at the moment of the combustion are transmitted to the inner surface of the housing.

SUMMARY OF THE INVENTION

It is an object of the present invention to provide a rotary internal combustion engine of the aforementioned kind which avoids the disadvantages of such engines known in the art.

It is a further object of the present invention to provide a rotary combustion engine in which the shaft will be rotated with uniform angular speed and in which the forces acting on the pistons will be transmitted to the shaft and not to the inner surface of the housing in which the pistons rotate.

An additional object of the present invention is to provide a rotary internal combustion engine of the aforementioned kind which may be operated with a fuel-air-mixture according to the Otto four stroke cycle or with diesel oil.

With these and other objects in view, which will become apparent as the description proceeds, the rotary internal combustion engine according to the present invention mainly comprises housing means having a chamber defined by an internal surface of oval outline, a shaft journalled in the housing means and extending through the chamber coaxially therewith, a plurality of pistons having each a wall portion facing the internal surface of the housing and a trailing end adjacent to the leading end of the following piston, combined sealing and linkage means interposed between the trailing end of each piston and the leading end of the following piston and articulatedly connecting adjacent ends of the pistons to each other, in which each of the combined sealing and linkage means is in sealing contact with the respective piston ends and with the internal surface of the housing means. The engine includes further motion transmitting means between the combined sealing and linkage means and the shaft, rigidly connected at inner portions thereof to the shaft and carrying the combined sealing and linkage means movable toward and away from the shaft axis, and means for transmitting radial forces acting on the pistons to the shaft and comprising arm means turnably mounted on the shaft and pivotally connected to the pistons intermediate the combined sealing and linkage means.

Preferably the plurality of pistons comprises two pairs of pistons, with the pistons of each pair arranged opposite to each other and the aforementioned arm means preferably comprise first arm means pivotally connected at outer ends respectively to the pistons of one pair and midway between the leading and the trailing end of the respective piston and second arm means extending transverse to the first arm means and being pivotally connected at outer ends respectively to the pistons of the other pair. The mentioned first arm means may comprise a single arm of predetermined thickness and the second arm means may comprise two arms respectively arranged to opposite sides of the single arm and having each a thickness which is about half the thickness of the single arm.

If the internal combustion engine according to the present invention is to be operated by injected diesel oil, and the plurality of pistons comprises two pairs of pistons with the piston of each pair located opposite each other, the arm means preferably comprise first arm means pivotally connected at outer ends respectively to the pistons of one pair midway between the leading and the trailing end of the respective piston and a pair of parallel second arm means respectively located to opposite sides of the shaft and each pivotally connected at outer ends respectively to the pistons of the other pair and pivotally connected midway between the outer ends thereof to said first arm means to portions of the latter located between the shaft and the outer ends of the first arm means. This will permit to provide in the pistons of the other pair centrally located chambers for the injection of diesel oil, and which will also assure a proper distribution of the forces created during the ignition of the diesel oil onto the shaft.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
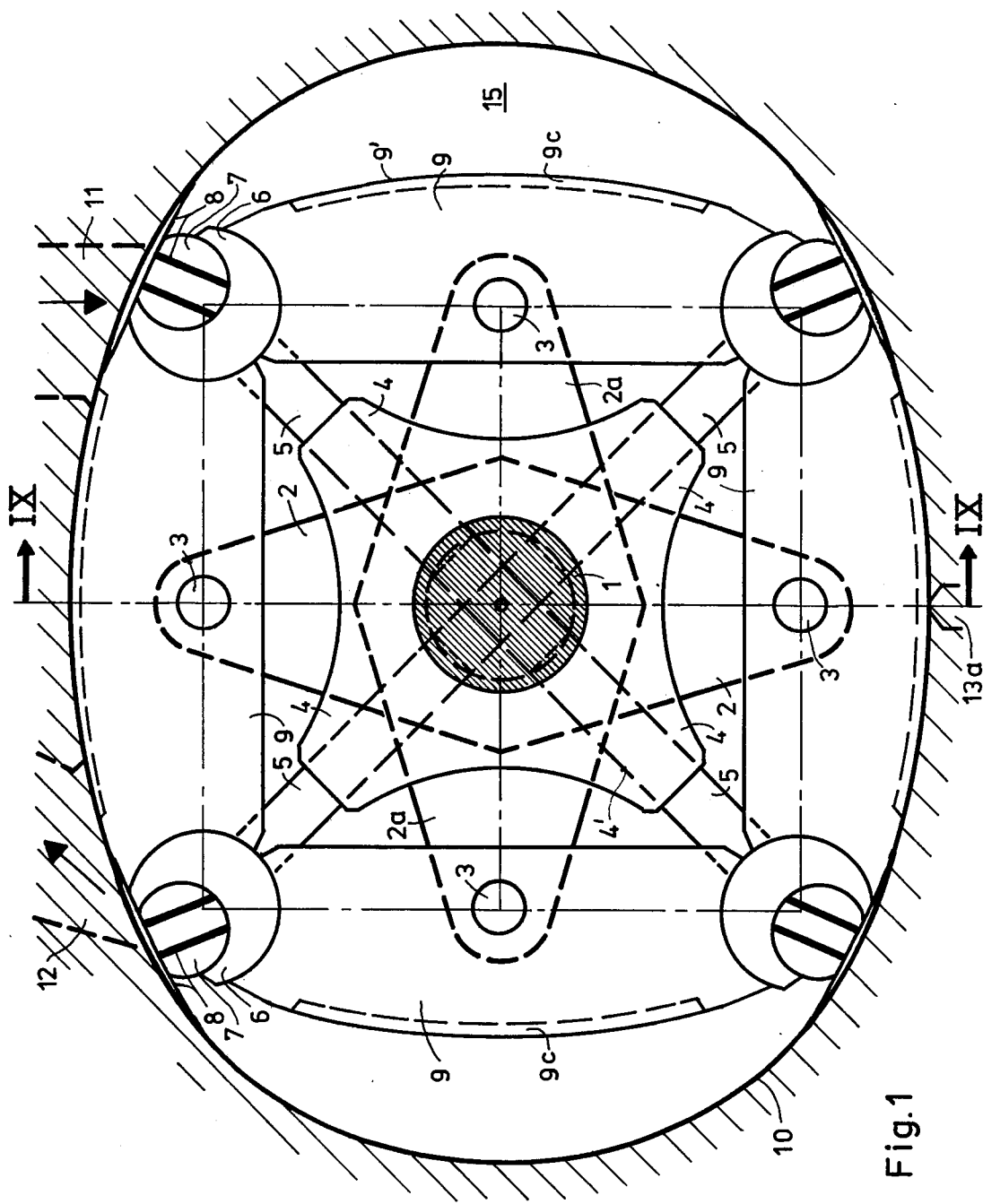
FIG. 1 is a cross-section, taken along the line I—I of FIG. 9, of a first embodiment of a rotary internal combustion engine according to the present invention which is to be operated by a mixture of fuel and air.
Figure 9:
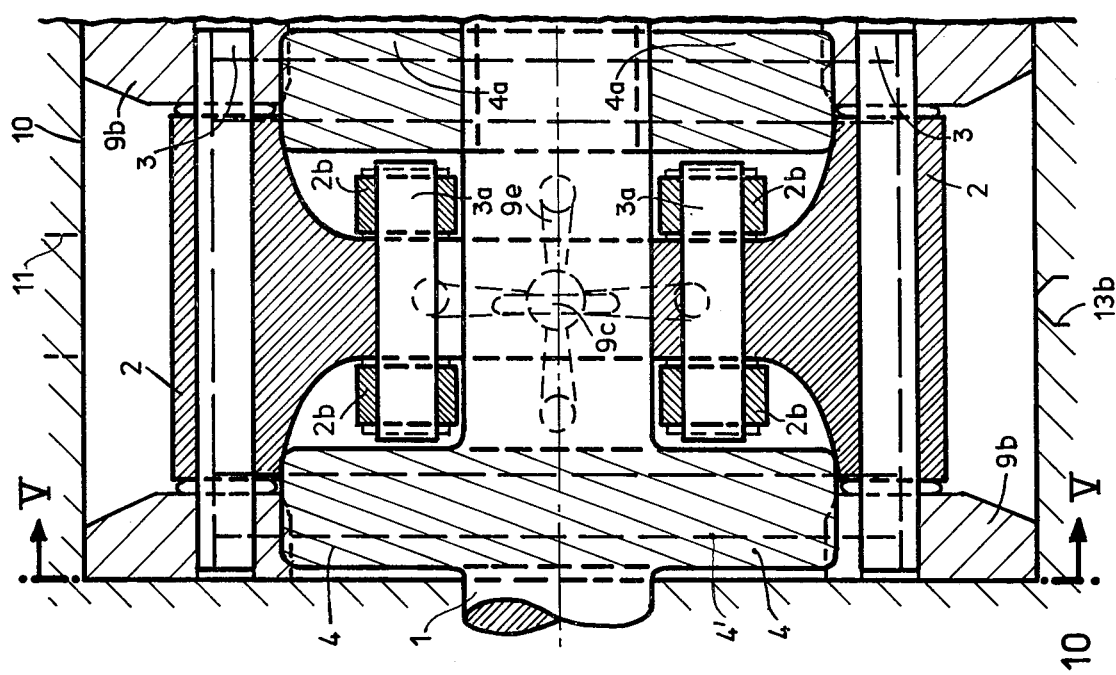
FIG. 9 is a cross-section taken along the line IX—IX of FIG. 1.
Figure 10:
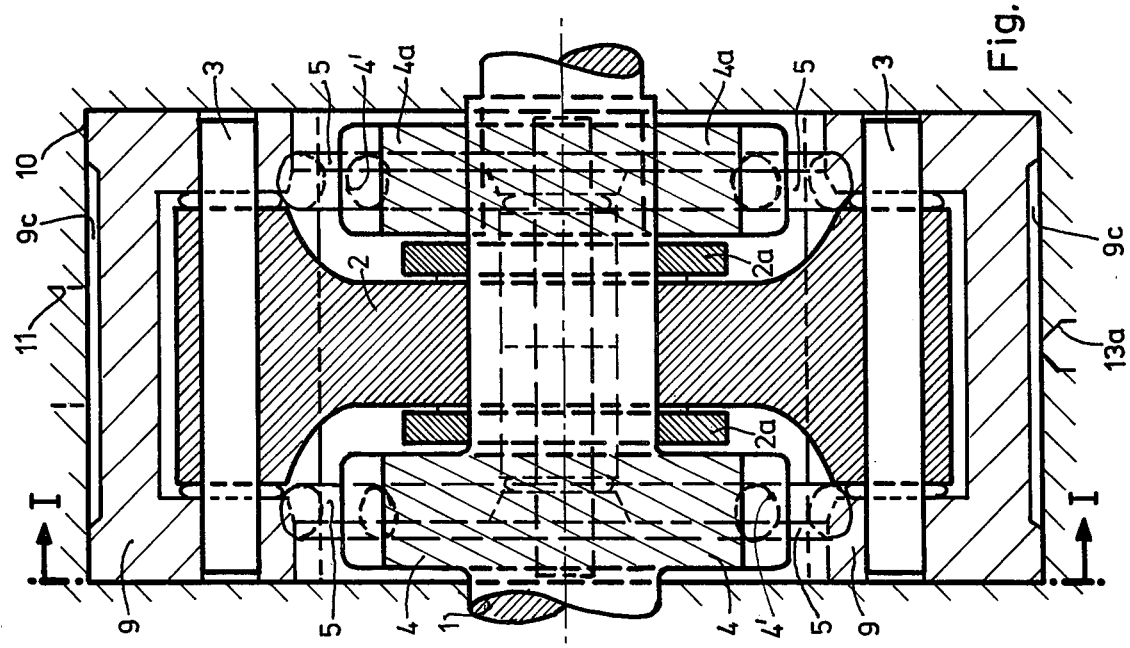
FIG. 10 is a cross-section taken along the line X—X of FIG. 5.

Referring now to the drawing and more specifically to FIGS. 1-4 and 9, in which a first embodiment of a rotary internal combustion engine according to the present invention is illustrated, which is to be operated with an air-fuel mixture according to the Otto four stroke cycle, it will be seen that this embodiment includes a housing, only partially illustrated in FIGS. 1 and 9, which forms a chamber having an inner peripheral surface 10 of oval outline. A shaft 1 journalled in a well-known, not specifically illustrated manner, in the side walls of the housing passes centrally through the aforementioned chamber. Four elongated pistons 9 of equal length are arranged within the chamber and each of the pistons has an outer curved surface 9' facing the internal peripheral surface 10 of the housing and having a curvature substantially identical to the maximum radius of curvature of the internal oval surface 10. The pistons 9 are articulatedly connected at adjacent ends to each other by combined linkage and sealing means, each of which preferably comprises a linkage roll 6, having an axis substantially parallel to the axis of the shaft 1, and engaging with its peripheral surface correspondingly curved faces 4 at the adjacent ends of the respective two pistons. Each of the combined sealing and linkage means preferably comprises also a seal carrying roll 7 having an axis parallel to the axis of the linkage roll 6 and eccentrically arranged with respect thereto. The axes of the rolls 6 and 7 are arranged in such a manner that a radial line passing through the axis of the shaft and that of the roll 6 passes also through the axis of the seal carrying roll 7. The roll 7 is provided with a pair of slots in which a pair of sealing strips 8 are slidably arranged so that during operation of the engine the sealing strips 8 are pressed by centrifugal forces against the internal surface 10.

Each of the pistons 9 is first provided with an elongated shallow cavity 9c extending inwardly from its outer surface 9' intermediate the opposite ends of the respective piston.

Figure 3:
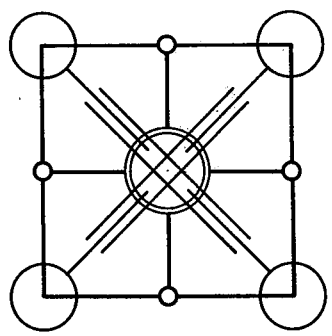
FIGS. 3 and 4 respectively schematically illustrate the drive connection between pistons and shaft in two extreme positions.
Figure 7:
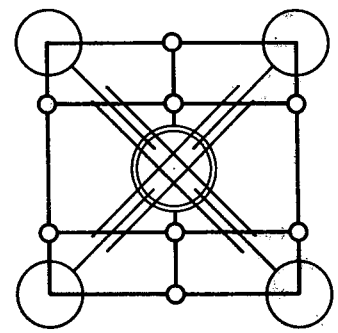
FIGS. 7 and 8 schematically illustrate the drive connection between the pistons and the shaft of the embodiment shown in FIG. 5 in two extreme positions.
Figure 4:
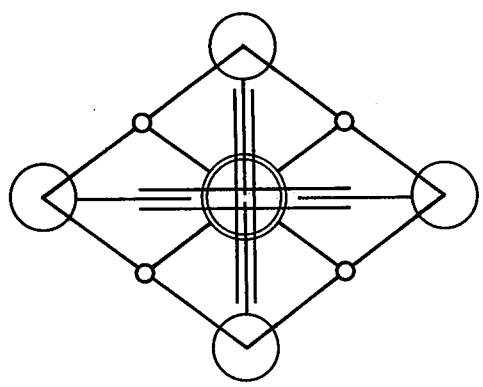
Figure 8:
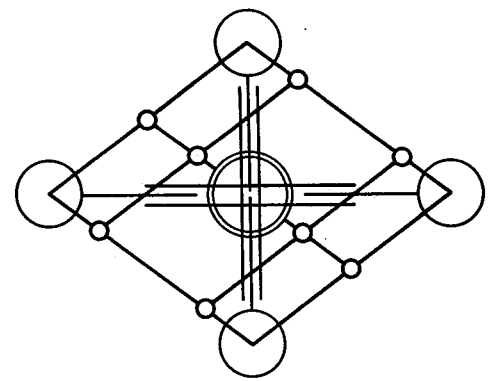

Motion transmitting means are provided between the combined sealing and linkage means 6, 7 and 8 and the shaft 1. These motion transmitting means preferably comprise, as best shown in FIGS. 1 and 9, two pairs of short arms 4, respectively 4a, which are fixedly connected to the shaft 1. As shown in FIG. 9 the arms 4 may be integrally formed with the shaft 1 and projecting in radial direction therefrom, whereas the arms 4a are keyed to the shaft 1, to be, during assembly and disassembly of the arrangement, removable from the latter. Each of the arms 4 and 4a is formed with a central, in radial direction extending bore 4' therethrough, which is continued through the shaft 1. A rod 5 fixedly connected at its outer end to the respective link roll 6 is slidably guided in each of the bores 4' and this rod may also project, depending on the position of the quadrangle formed by the pistons 9, also into the bore extensions formed in the shaft 1, as schematically illustrated in FIGS. 3 and 4.

Figure 2:
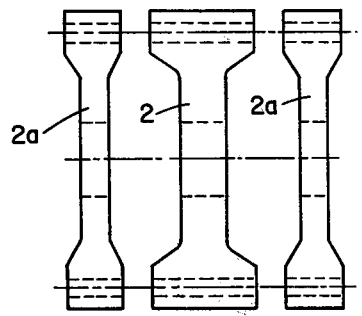
FIG. 2 is a side view of arm means to be used in the embodiment shown in FIG. 1.

The arrangement includes further means for transmitting radial forces acting on the pistons 9 to the shaft 1 and these means comprise arm means 2 and 2a turnably mounted on the shaft 1 and pivotally connected at outer ends respectively to the pistons 9, intermediate the ends of the latter, by pins 3 passing through corresponding bores at the outer ends of the arm means 2 and 2a and corresponding bores formed in the pistons 9. The aforementioned arm means preferably comprise first arm means 2 of a predetermined thickness, as illustrated in FIGS. 2 and 9, and respectively connected at the outer ends to a pair of opposite pistons 9, and a pair of second arms 2a having each a thickness of about half of the thickness of the arm 2 and being arranged to opposite sides of the latter while extending transverse thereto and being connected at the outer ends to the other pair of pistons 9.

The embodiment shown in FIG. 1 includes further an inlet channel 11 for feeding a mixture of fuel and air into the interior of the chamber defined by the internal surface 10 and an outlet or exhaust channel 12. The inlet and outlet channels 11 and 12 are respectively arranged substantially symmetrically to a plane of symmetry including the axis of the shaft 1 and passing through the points of maximum curvature of the internal surface 10, and a sparkplug 13a arranged in the aforementioned plane of symmetry, but on a portion of the internal surface 10 which is opposite the portion in which the inlet and outlet channels are arranged. In the embodiment shown in FIG. 1, the four pistons 9 are of exactly the same construction, they are connected by the link rolls 6 for simultaneous rotation about the axis of the shaft 1 and tiltable with respect thereto about the axes of the pins 3 on the arms 2 and 2a. The centrally supported substantially equal masses of these four arms increase the total mass rotating about the axis of the shaft 1.

The internal combustion engine illustrated in FIGS. 1-4 and 9 will operate as follows:

When one of the pistons 9 passes the inlet or suction channel 11, a gas-air mixture, from a source not shown in the drawing, will enter the space defined by the outer surface of the piston and the facing portion of the internal surface 10 of the housing and when the piston moves in clockwise direction and the sealing roll 8 connected to the trailing end of the uppermost piston 9, as viewed in FIG. 1, passes the right edge of the suction channel 11 the gas-air mixture in the working chamber 15 will be compressed during further movement of the piston in clockwise direction, to be finally ignited by the sparkplug 13a, when the piston moves opposite to the latter. The expanding combustion gases will now drive the piston and the combustion gases will leave the working chamber as the latter opens into the exhaust or outlet channel 12. It will be noted that, as the piston approaches the exhaust channel 12, the volume of the working chamber decreases again so that a proper scavaging of this chamber will be assured. The arms 4, 5 will transmit the movement of the pistons to the shaft 1 and rotate the latter, with substantially uniform circumferential speed. At the same time the arms 2 and 2a will transmit radial forces imparted to the pistons to the shaft 1, to thereby reduce the action of such forces on the link rolls 6, reducing thereby the friction between the engaging surfaces of pistons and link rolls, to thereby increase the useful life of these elements.

The embodiment shown in FIGS. 5-8 and 10 illustrates a rotary internal combustion engine to be operated with diesel oil. Elements having the same function as the elements in the embodiment shown in FIGS. 1-4 and 9 are designated in the embodiment shown in FIGS. 5-8 and 10 with the same reference numerals.

Figure 5:
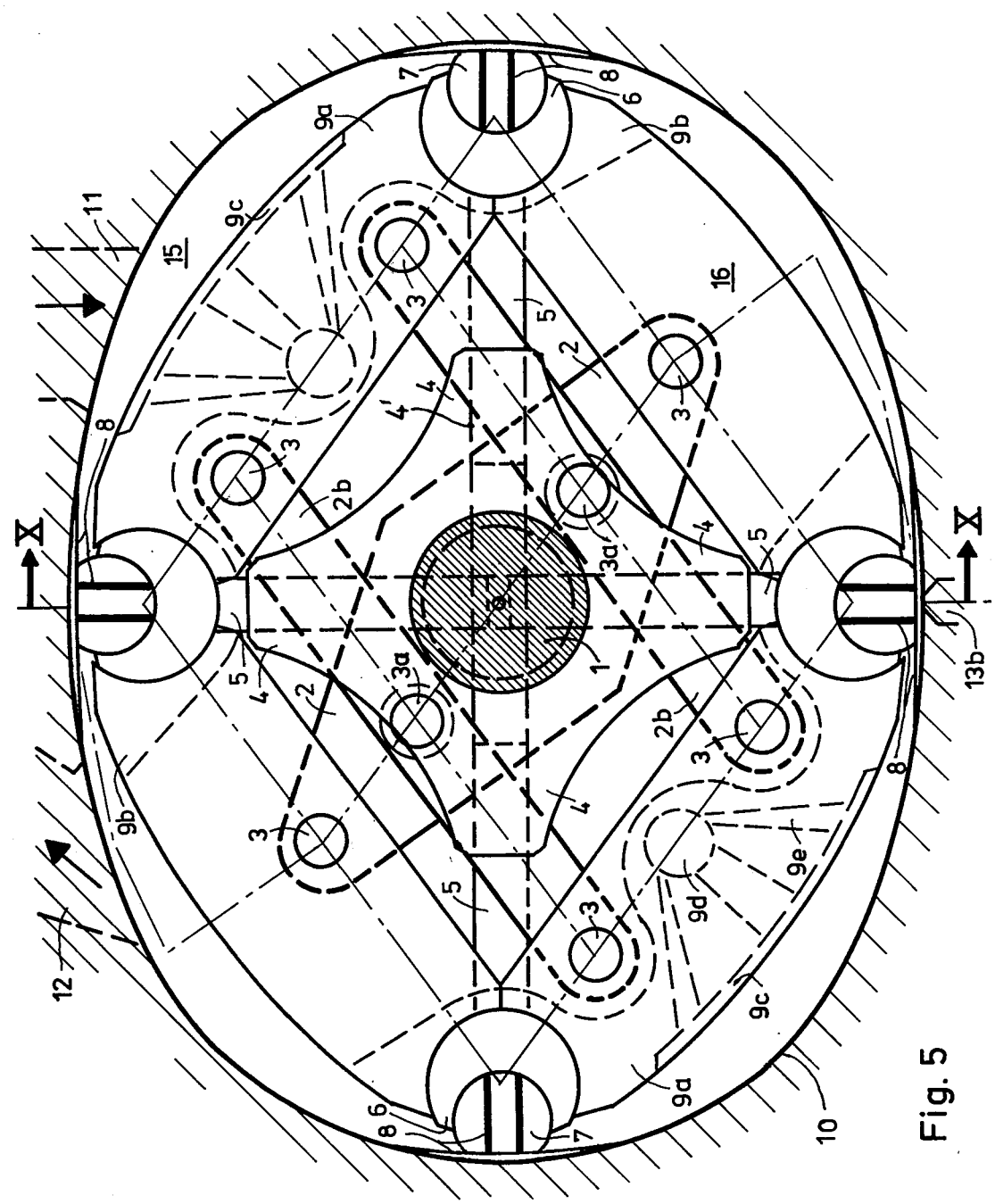
FIG. 5 is a cross-section, taken along the line V—V of FIG. 10, of a second embodiment of a rotary internal combustion engine according to the present invention, constructed for operation by injection of diesel oil.

While in the first-described embodiment all pistons 9 are constructed exactly in the same manner, in the embodiment shown in FIG. 5 only one pair of opposite pistons 9a is provided at its outer surface with a shallow elongated cavity 9c, and in addition each of the pistons 9a is provided, intermediate its ends in the interior thereof, with a spherical chamber 9d which communicates with the cavity 9c through a plurality of channels 9e. The other pair of opposite pistons 9b do not form working chambers with the internal surface 10 of the housing, but these pistons 9b are formed with passages of large cross-section 16 therethrough, so that the pistons 9b form cooling pistons through which fresh air entering through the inlet channel 11 may pass into the space defined by the inner surfaces of the four pistons.

Figure 6:
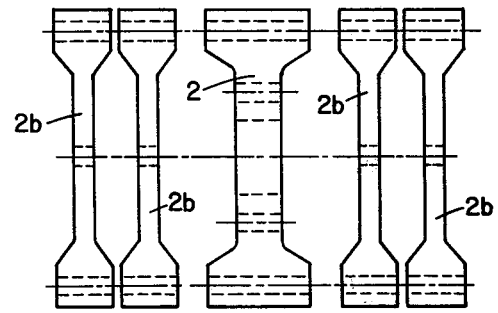
FIG. 6 is a side view of arm means to be used in the embodiment shown in FIG. 5.

The embodiment shown in FIG. 5 differs further from the above-described embodiment in that the arms which take up radial forces transmitted to the pistons during operation of the engine are slightly differently arranged. The arms 2, which transmit the forces imparted to the pistons 9b to the shaft 1, are constructed in the same manner as the arms 2 shown in FIG. 1, but instead of the arms 2a shown in FIG. 1, there are provided in the embodiment shown in FIG. 5 two pairs of parallel arms 2b arranged to opposite sides of the shaft 1 and respectively connected at opposite ends by pins 3 to the pistons 9a and midway between the opposite ends by pins 3a to the aforementioned arms 2. As shown in FIG. 6, the thickness of each of the arms 2b is about half of the thickness of the arm 2. The embodiment shown in FIG. 5 differs from the first-described embodiments further in that, instead of the sparkplug 13a, a diesel oil injection nozzle 13b is provided at the same location as the sparkplug 13a shown in FIG. 1.

The second embodiment described in connection with FIGS. 5-8 and 10 will operate as follows:

When one of the working pistons 9a passes the inlet or suction channel 11 air will be sucked into the working chamber 15 between the outer surface of the respective piston 9a and the internal surface 10 of the housing, and during movement of the working piston 9a in clockwise direction, the combustion air will be compressed to an increasing extent which reaches its maximum when the working piston moves opposite the injection nozzle 13b. Diesel oil is then injected through the injection nozzle 13b in finely divided form into the chamber and due to the relative great distance of the chamber 9d from the inner end of the injection nozzle, the diesel oil will be spread in finely divided form against the hot walls of the chamber 9d, so that very good pre-ignition will occur in this chamber. The pre-ignition mixture will stream through the channels 9e out of the chamber 9d in widely dispersed form and intimately mix with the combustion air so that a perfect main combustion will occur during further rotation of the working piston. The direction of the fuel injection, the shape of the chamber 9d and the shape and relative arrangement of the channels 9e is made in such a manner so as to produce in the chamber 9d increased turbulence to insure an intimate mixture of the injected fuel and the combustion air.

When one of the cooling pistons 9b passes the inlet or suction channel 11, air which now forms cooling air, wll pass into the space between the outer surface of this piston and the inner surface 10 of the housing and such air will then pass through the opening 16 in the respective cooling piston into the central space of the housing to thereby assure a perfect cooling of the various elements. Such cooling air will be finally discharged through the exhaust channel 12.

It will be understood that each of the elements described above, or two or more together, may also find a useful application in other types of rotary internal combustion engines differing from the types described above.

While the invention has been illustrated and described as embodied in a rotary internal combustion engine, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a rotary internal combustion engine, a combination comprising housing means having a chamber defined by internal surface of oval outline; a shaft journalled in said housing means and extending through said chamber coaxially therewith; a plurality of pistons having each a wall portion facing said internal surface and a trailing end adjacent to the leading end of the next-following piston; combined sealing and linkage means interposed between the trailing end of each piston and the leading end of the following piston and articulatedly connecting the ends of said pistons to each other, each of said combined sealing and linkage means being in sealing contact with the respective piston ends and with said internal surface of said housing means; motion-transmitting means between said combined sealing and linkage means and said shaft rigidly connected at inner portions thereof to said shaft and carrying said combined sealing and linkage means movable toward and away from the axis of said shaft; and means serving only to transmit radial forces acting on said pistons to said shaft and comprising arm means turnably mounted on said shaft and pivotally connected at outer ends to said pistons intermediate said combined sealing and linkage means.

2. A combination as defined in claim 1, wherein said plurality of pistons comprises four pistons of equal length arranged in said chamber so as to form an equilateral linked quadrangle, and wherein said motion transmitting means comprises two members fixed to said shaft for rotation therewith and respectively located to opposite sides of said arm means, and each having four radial projections respectively directed toward said combined sealing and linkage means, each of said radial projections being formed with a central bore extending therethrough and having a coaxial continuation extending through said shaft, and four rods respectively guided in said bores of said projections and fixedly connected at outer ends to said combined sealing and linkage means, respectively.

3. A combination as defined in claim 1, wherein said plurality of pistons comprises two pairs of pistons, with the pistons of each pair arranged opposite to each other, and wherein said arm means comprises first arm means pivotally connected at outer ends respectively to the pistons of one pair midway between the leading and the trailing end of the respective piston and second arm means extending transverse to said first arm means and being pivotally connected at outer ends respectively to the pistons of the other pair.

4. A combination as defined in claim 3, wherein each of said arm means is provided in the region of its outer end with a bore therethrough extending parallel to the axis of said shaft, and including a pivot pin for each of the bores extending therethrough and through corresponding bores in the piston for respectively pivotally connecting said outer ends of said arm means to said pistons.

5. A combination as defined in claim 3, wherein the outer ends of said second arm means are pivotally connected to said pistons of said other pair midway between the leading and the trailing end of the respective piston.

6. A combination as defined in claim 5, wherein said first arm means comprises a single arm of predetermined thickness and said second arm means two arms respectively arranged to opposite sides of said single arm and having each a thickness which is about half the thickness of the single arm.

7. A combination as defined in claim 1, wherein said plurality of pistons comprises two pairs of pistons with the pistons of each pair located opposite each other, and wherein said arm means comprises first arm means pivotally connected at outer ends respectively to the pistons of one pair midway between the leading and the trailing ends of the respective piston and a pair of parallel second arm means respectively located to opposite sides of said shaft and each pivotally connected at outer ends respectively to the pistons of the other pair and pivotally connected midway between the outer ends thereof to said first arm means to portions of the latter located between said shaft and the outer ends of said first arm means.

8. A combination as defined in claim 7, wherein said first arm means comprises a single arm of predetermined thickness and wherein each of said pair of second arm means comprises two arms respectively arranged to opposite sides of said single arm and each having a thickness substantially half of the thickness of said single arm.

* * * * *